United States Patent Office 3,360,351
Patented Dec. 26, 1967

3,360,351
METHOD FOR FABRICATING MULTIPLE GLAZING UNITS
Donald W. Murray, Cheswick, and Larry K. King, Natrona Heights, Pa., assignors to Pittsburgh Plate Glass Company, Pittsburgh, Pa., a corporation of Pennsylvania
No Drawing. Filed Sept. 3, 1964, Ser. No. 394,322
5 Claims. (Cl. 65—24)

The present invention relates to an improved method for producing all-glass, multiple glazing units and, in particular, to a method for protecting the surfaces of glass sheets or plates during the manufacture of welded double glazing units.

A typical process for making welded double glazing units is disclosed in U.S. Patents No. 2,624,979 and No. 2,999,036, granted to W. R. Clever et al., and application Ser. No. 315,989, filed October 14, 1963, by Edwin C. Snyder, and all assigned to the assignee of the present invention. As disclosed therein, a top and bottom glass sheet, with reference being to their relative position during welding, are placed on a roller conveyor line and carried in sequence through a washing, rinsing and drying operation.

Immediately thereafter, the top sheet is striped with an electrically conductive material, such as colloidal graphite, near the edges of the sheet. This stripe extends continuously around the periphery of the sheet and may be either on the top or the bottom surface of the top sheet. The glass sheets may be in side by side position when striped or one sheet may be in vertical alignment with the other sheet. The glass sheets are then positioned in superimposed, face-to-face relation on a charging car for the preheating and welding operations.

More specifically, one preferred manner in which the above fabrication process is accomplished is by placing the top sheet and the bottom sheet on a conveyor with one sheet following the other sheet in direct alignment therewith. The two sheets are moved along the conveyor through a washing, rinsing and drying operation. The sheets are then positioned and centered in vertical relation to vacuum heads and striping applicators. The vacuum heads engage and support the glass sheets and the striping applicators stripe the top sheet with electrically conducting solution. The sheets are then deposited on a charging car in proper, superimposed, face-to-face alignment for fabrication into the desired welded double glazing unit.

After the sheets are superimposed and aligned in the above manner, they are heat treated for a period of from 40 seconds to 2 minutes on a preheat furnace having an ambient temperature of approximately 1300° F. The larger glass units, for which the method of the present invention is particularly applicable, are usually heat treated in the preheat furnace for from 1 to 2 minutes. During preheating, the glass sheets are heated to a temperature of approximately 600°–800° F. in order to avoid thermal shock to the glass sheets during the subsequent welding operation.

After the superimposed glass sheets are heat treated, they are conveyed into the welding furnace where the ambient temperature is approximately 800°–850° F. Upon attaining the desired position in the welding furnace, vacuum chucks cause the superimposed sheets to be separated in slightly spaced relationship to each other. The welding operation is then effected on the thus separated glass sheets.

Welding is accomplished by passing an electric current through the stripe of electrically conductive material to effect heating of the stripe and the glass immediately adjacent hereto. The margins of the top or upper sheet are heated in this manner until they droop and become welded to the margins of the bottom or lower sheet. The vacuum chuck is then operated to pull the top sheet upwardly to provide a chamber between the sheets. During this movement the air pressure within the chamber is abruptly increased by permitting air from a pressurized external source to enter the unit through a pore opening provided in a face or an edge of the unit. This operation effects filleting of the welded connection between the sheets. The pore opening then allows for equalization of the air pressure inside and outside the unit duuring subsequent cooling and annealing.

In a manufacturing process, such as described above, there is a tendency for the glass sheets to fuse together during preheating, thus prohibiting their separation in preparation for the welding operation. This has constituted a serious problem and has resulted in producing a lower yield than is desirable. This fusion at the superimposed surfaces or interfaces is readily observable in the welding furnace where the lifting members and vacuum chucks come into contact with the superimposed glass sheets and are then unable to separate them for welding. Thus, in the past, many glass sheets, particularly large sheets that are intended for fabrication of large double glazed units, have been observed to fuse together at their adjacent inner surfaces during the preheating operation.

Another problem that is encountered is the tendency to scratch one or both of the glass sheets at their interfaces during the step of placing the glass sheets in superimposed, face-to-face relationship in preparation for preheating and welding. This scratching results from relative movement between the glass sheets either while they are being placed in superimposed relationship or during the concurrent aligning operation. The scratches may be caused either by the presence of minute abrasive particles between the glass sheets or merely by sliding one glass sheet surface across the other. Scratches produced in this, or any other, way will cause the rejection of the multiple glazing unit since scratch removal from these units is neither economically nor commercially feasible.

A further problem which is closely related to the above problems is that of the decreased speed of operation, and thus a decrease in the rate of production, that results whenever attempts are made by the operator to compensate for the problems of fusion and scratching. Thus, operator attempts to free fused glass sheets, as well as his taking excessive care to avoid or immediately reject scratched sheets, invariably slows down the overall speed of operation.

The present invention provides a means by which the above and other problems may be successfully eliminated or minimized. Briefly, it has been discovered that a pair of glass sheets can be superimposed, one on top of the other, and then preheated to the desired temperature for welding without a substantial incidence of the above-mentioned problems. In the practice of the present invention, this is accomplished by uniformly spraying the glass sheet surfaces that are placed adjacent to one another with demineralized water, or other suitable liquid carrier, having dispersed or dissolved therein diatomaceous earth, mica, or polyethylene glycol, known commercially as "Carbowax." Small amounts of any of these materials are dispersed or dissolved in a suitable, preferably nonvolatile, organic or inorganic liquid carrier and the mixture is then sprayed onto a single surface of one of the glass sheets prior to the time at which they are stacked together. The use of the liquid carrier permits ease of handling and enhances the uniform deposition of the separating material on the glass sheet surface.

More specifically, the invention consists of spraying one of the interfacing surfaces of the pair of glass sheets with a material that will keep the surfaces from physically contacting one another. The spraying is accomplished prior to superimposing and preheating the glass sheets, thereby prohibiting them from becoming scratched or fused together during these operations.

A number of materials could be employed in such a spraying operation. However, particular materials have been selected because they can be sprayed in a concentration that will prevent fusion and scratching and, at the same time, either be volatilized off of the glass surface or present in so small a quantity and of such a particle size that they cannot be observed after the superimposed plates have been fabricated into a welded double glazed unit. To accomplish this, the present invention employs demineralized water dispersions of finely divided mica and diatomaceous earth and solutions of polyethylene glycol, having a molecular weight of between about 1,000 and 20,000.

Dispersions or solutions of these materials in demineralized water have been uniformly sprayed on the upper surface of the bottom sheet just prior to superimposing the two glass sheets and immediately before subjecting them to the preheating treatment. During the preheat treatment, the water is evaporated, leaving the dispersed or dissolved material between the facing surfaces of the glass sheets to serve as a separating material. This material prevents glass to glass contact during the preheat treatment and until the glass sheets are separated by means of the vacuum chuck apparatus in the welding furnace.

When only small amounts of diatomaceous earth or mica separating materials are employed, these materials need not be removed from the interfacing surfaces prior to the welding operation. The reason for this is that, even though these separating materials remain within the double glazed unit after fabrication, they are present in such small amounts that they are unnoticeable and not objectionable.

Of the materials employed to date, the use of various diatomaceous earths is preferred. These diatomaceous earths are the siliceous skeletons of pre-historic unicellular algae which are marketed, under various trade names, under the generic term of diatomite or diatomaceous earth. Many of these are composed of finely divided silica. Thus far, we have utilized as little as 0.05 gram of finely divided diatomaceous earth per quart of demineralized water, and as much as 0.6 gram per quart. None of the concentrations within that range were found to result in objectionable welded double glazed units. However, it was observed that the 0.05 gram per quart dispersion was approaching the lower limit of providing a desirable amount of separating material. With this low concentration, one had to spray a little longer than with a higher concentration. It is thought that one gram per quart would probably result in an objectionable unit, wherein the separating material would be visible in the finished unit.

The preferred treatment consists of a spray dispersion containing approximately 0.1 gram of finely divided diatomaceous earth per quart of demineralized water and applied to approximately 1100 square feet of glass. Of course, a dispersion of 0.05 gram of diatomaceous earth per quart of demineralized water could be employed if one were to utilize 1½ to 2 quarts per 1100 square feet of glass. In addition, one could employ a dispersion containing 0.2 gram per quart if applied in a slightly lighter fashion to 2200 square feet of glass.

The method of spraying is also significant. It has been found most desirable to hold a spray gun approximately 1½ to 2 feet away from the glass surface being sprayed and to deposit the spray in the form of a fine mist on the glass surface. One must be careful not to deposit thick layers or a heavy mist of liquid upon the glass surface. It has been observed that thick layers and large droplets tend to evaporate in a manner that causes the disposed material to build up in heavy, localized concentrations. This results from the tendency of large liquid masses to evaporate from their peripheral areas. Thus, due to the surface tension of the liquid carrier, the dispersed material tends to be drawn into the central or last portion of the liquid to evaporate, thereby building up a heavier concentration of dispersed material than is desired. Such spot concentrations can result in an objectionable unit.

As a substitute for diatomaceous earth, we have experimented with another finely divided refractory material, mica. To date, we have only tried a dispersion of 0.2 gram of mica per quart of demineralized water. Of the units sprayed with the mica dispersion, each measuring 48 inches by 68 inches, no loss resulted due to fusion or scratching of the superimposed glass sheets. In previous production runs of units of this size, while not employing separating materials, substantial losses had been encountered because of fusion and scratching.

In addition to the above spray dispersions, a spray solution containing polyethylene glycol has also been employed to produce the desired results. Spray solutions employing from 5 to 25 percent by weight of polyethylene glycol, having a molecular weight of between about 1,000 and 20,000, in demineralized water can be employed with no objectionable results. The water evaporates during preheating, leaving the wax as a separating material between the sheets. Then, during the welding operation, when the glass sheets are separated the polyethylene glycol volatilizes or distills off.

There is one operational difficulty with the polyethylene glycol solutions. These solutions are sprayed and deposit as a very fine mist. This mist is so fine that it has a tendency to drift into the surrounding areas and has been observed to create difficulties with regard to other operations, particularly the graphite striping operation. The mist floats down the line and interferes with the striping operation. Thus, from an operational point of view, either the diatomaceous earth or the mica appear to be the more desirable separating materials in lieu of providing a suitable vacuum hood or chamber in which to contain the polyethylene glycol mist.

From the above description and specific embodiments of the present invention, it will be readily apparent to those skilled in the art that various modifications may be made without departing from the spirit of the invention. For example, various materials, arrangement of parts and components within the range of equivalents other than those specifically mentioned, may be employed in practicing the method of the present invention. Also, it should be obvious that either one or both of the interfacing surfaces of the glass sheets may be coated with the separating material. In addition, any satisfactory contacting or coating procedure other than the disclosed spray application can be used to deposit the liqiud mixture containing the separating material or the separating material alone onto the surfaces of the glass sheets. Such procedures may include roller applicators, dipping tanks, dusting and the like.

While the present invention has been described with reference to the specific details of certain embodiments, it is not intended that such details shall be regarded as limitations upon the scope of the invention, except insofar as included in the accompanying claims.

We claim:

1. In a method of treating a pair of glass sheets which are subsequently fused together around the edges thereof to form a welded multiple glazing unit, the improvement comprising, depositing a finely-divided refractory material between the facing surfaces of said pair of glass sheets, said refractory material being of a quantity and size that would not be objectionable if present between the facing surfaces of a completed double glazing unit, and heating the glass sheets and fusing the edge portions of said sheets together without removing said refractory material from between said facing surfaces.

2. A method according to claim 1 wherein the refractory material is diatomaceous earth.

3. A method according to claim 1 wherein the refractory material is mica.

4. In a method of treating a pair of glass sheets which are subsequently fused together around the edges thereof to form a welded multiple glazing unit, the improvement comprising, depositing a separating material between the facing surfaces of said pair of glass sheets, and heating the glass sheets and fusing the edge portions of said sheets together at a temperature at which the separating material distills off from between said facing surfaces.

5. A method according to claim 4 wherein the separating material is polyethylene glycol.

References Cited
UNITED STATES PATENTS

| | | | |
|---|---|---|---|
| 2,486,153 | 10/1949 | Gwyn | 65—24 |
| 2,697,676 | 12/1954 | Black et al. | 65—24 X |
| 2,725,320 | 11/1955 | Atkeson et al. | 65—24 X |
| 3,071,501 | 1/1963 | Cowley et al. | |
| 3,268,316 | 8/1966 | Snyder | 65—23 X |

DONALL H. SYLVESTER, *Primary Examiner.*
R. L. LINDSAY, *Assistant Examiner.*